United States Patent [19]

Allread

[11] Patent Number: 5,290,075
[45] Date of Patent: Mar. 1, 1994

[54] CONNECTOR AND BALL JOINT ASSEMBLY

[75] Inventor: Alan R. Allread, Jackson, Mich.

[73] Assignee: Aeroquip Corporation, Maumee, Ohio

[21] Appl. No.: 898,524

[22] Filed: Jun. 15, 1992

[51] Int. Cl.⁵ .......................................... F16L 27/047
[52] U.S. Cl. ..................................... 285/261; 285/351
[58] Field of Search ................ 285/261, 263, 262, 271, 285/351

[56] References Cited

U.S. PATENT DOCUMENTS

| | | | |
|---|---|---|---|
| 790,118 | 5/1905 | Everson | 285/271 |
| 1,568,649 | 1/1926 | Woodruff | 285/271 X |
| 1,824,792 | 9/1931 | Reure | 285/271 |
| 2,564,938 | 8/1951 | Warren | 285/261 X |
| 2,931,672 | 4/1960 | Merritt et al. | 285/266 |
| 3,475,039 | 10/1969 | Ortloff | 285/261 X |
| 3,596,934 | 5/1969 | De Cenzo | 285/261 X |
| 3,712,645 | 1/1973 | Herter | 285/261 X |
| 4,443,030 | 4/1984 | Hairston | 285/263 |
| 5,127,681 | 7/1992 | Thelen et al. | 285/263 X |

FOREIGN PATENT DOCUMENTS

| | | | |
|---|---|---|---|
| 2006845 | 8/1971 | Fed. Rep. of Germany | 285/261 |
| 479569 | 2/1938 | United Kingdom | 285/261 X |
| 992297 | 5/1965 | United Kingdom | 285/263 |

Primary Examiner—Dave W. Arola
Attorney, Agent, or Firm—Emch, Schaffer, Schaub & Porcello Co.

[57] ABSTRACT

A connector and ball joint assembly including a connector, a receiving means, such as a conduit of a component of an air conditioning system, and a ball. The connector includes a flange and a cylindrical inner surface. A portion of the inner surface includes threads. The component conduit has an exterior surface and an interior surface. A portion of the exterior surface includes threads for receiving the threads on the inner surface of the connector. The interior surface of the component conduit defines an open end. The ball includes a wall having a spherically-shaped outer surface defining an open end. The wall is positioned adjacent the flange of the connector and the interior surface of the component conduit. Annular gaskets can be positioned between the wall, the connector and the component conduit to seal the joint.

16 Claims, 4 Drawing Sheets

CONNECTOR AND BALL JOINT ASSEMBLY

DESCRIPTION

1. Technical Field

The present invention relates to a connector and ball joint assembly. More specifically, the present invention is directed to a connector and ball joint assembly for attaching a rigid length of tubing to a component of, for example, an automotive air conditioning system. The tubing can be fixedly attached to the component or it can articulate with respect to the component depending on the application.

2. Background of the Invention

Flexible connectors are known in the art. Examples of various connectors can be found in U.S. Pat. Nos. 2,010,546; 2,273,395; 2,657,076; 2,836,436; 3,528,260; 3,788,394; 4,408,467; 4,480,857; 4,793,150, 5,048,309 and 5,048,873.

In a typical automobile air conditioning system presently in use, refrigerant is conveyed by flexible hoses and rigid tubing to the compressor, the condenser and the evaporator. The flexible hoses and rigid tubing accommodate the vibration and movement existing between the vehicle frame, upon which the condenser and evaporator are rigidly affixed, and the vehicle engine upon which the compressor is rigidly affixed.

Refrigerant utilized in automobile air conditioning systems has historically been a chloroflourocarbon (CFC). More recently, hydrofluorocarbon (HFC) refrigerant has been adopted and is expected to replace CFC refrigerant as the dominant refrigerant used in such systems. HFC refrigerant is extremely expensive, much more expensive than CFC refrigerant. However, with progressive taxation recently placed on CFC refrigerant, its cost will similarly rise. Further, refrigerants have been found to be detrimental to the environment if released into the atmosphere. Accordingly, it is important that air conditioning systems used in vehicles be designed to prevent, to the greatest degree possible, any escape of CFC and HFC refrigerants into the atmosphere. The challenge to develop such a system has intensified because flexible hose assemblies presently used to convey refrigerant through the system often permit refrigerant loss by effusion through the hose wall and end fitting connection sites. Further, flexible hoses permit variable levels of moisture ingression which greatly reduces the efficiency of the system. Flexible hoses twisted during installation also place undesirable stresses and potential sources of failure or leakage at the fittings fastening such hoses to the components of the system.

In order to utilize rigid lengths of tubing without flexible hoses in a system, it is necessary to include a connector and flexible joint at the connection of a system component and a length of rigid tubing that permits pivotal, articulating and rotational movement of the tubing relative to the component during installation and use of the system. It is also necessary to provide a connector and ball joint assembly that provides an excellent seal between the component and the length of tubing to prevent effusion of refrigerant or infusion of moisture in the system.

SUMMARY OF THE INVENTION

The present invention is directed to a connector and ball joint assembly. The assembly includes a connector, a receiving means, such as a conduit of a component of an air conditioning system, and a ball. The connector includes a flange and a cylindrical inner surface. A portion of the inner surface includes threads. The component conduit has an exterior surface and an interior surface. A portion of the exterior surface includes threads for receiving the threads on the inner surface of the connector. The interior surface of the component conduit defines an open end. The ball includes a wall having a spherically-shaped outer surface defining an open end. The wall is positioned adjacent the flange of the connector and the interior surface of the component conduit. Annular gaskets may be positioned between the wall, the connector and the component conduit to seal the joint.

The primary object of the present invention is to provide a connector and ball joint assembly that provides flexibility to the attachment of a length of rigid tubing and an air conditioning component.

A major object of the present invention is to provide a connector and ball joint assembly that provides an excellent seal to prevent effusion of refrigerant or infusion of moisture in an air conditioning system.

Other objects and advantages of the present invention will become apparent as the invention is described in detail with reference being made to the accompanying drawings.

DESCRIPTION OF THE PREFERRED EMBODIMENTS

Figure 1:
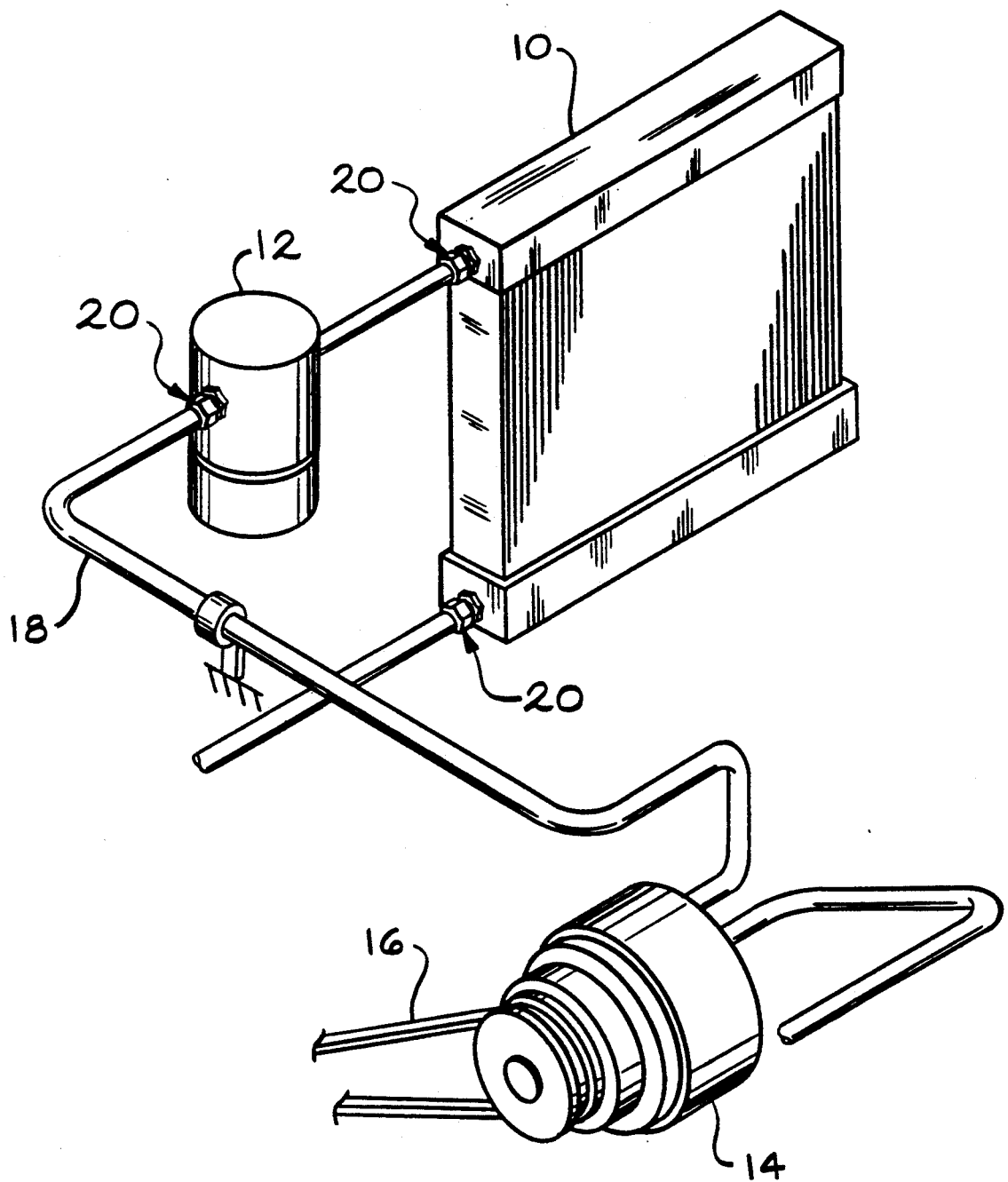
FIG. 1 is a schematic view of an automotive air conditioning system with the present invention included therein.

Referring now to the drawings, the preferred embodiments of the present invention are shown. Referring to FIG. 1, an automotive air conditioning system is shown. The system includes an evaporator 10, a drier receiver filter 12 and a compressor 14 connected to a drive belt 16. The system further includes rigid tubing, for example a tube 18, to allow refrigerant to flow through the system. The tubes move in response to certain forces placed on them such as movement of the vehicle, expansion and contraction and activation of, for example, the compressor 14. The tubes also move during installation of the system in a vehicle. The connector and ball joint assembly 20 of the present invention is placed at various points within the system to allow the tubes to move in response to such forces.

Figure 2:
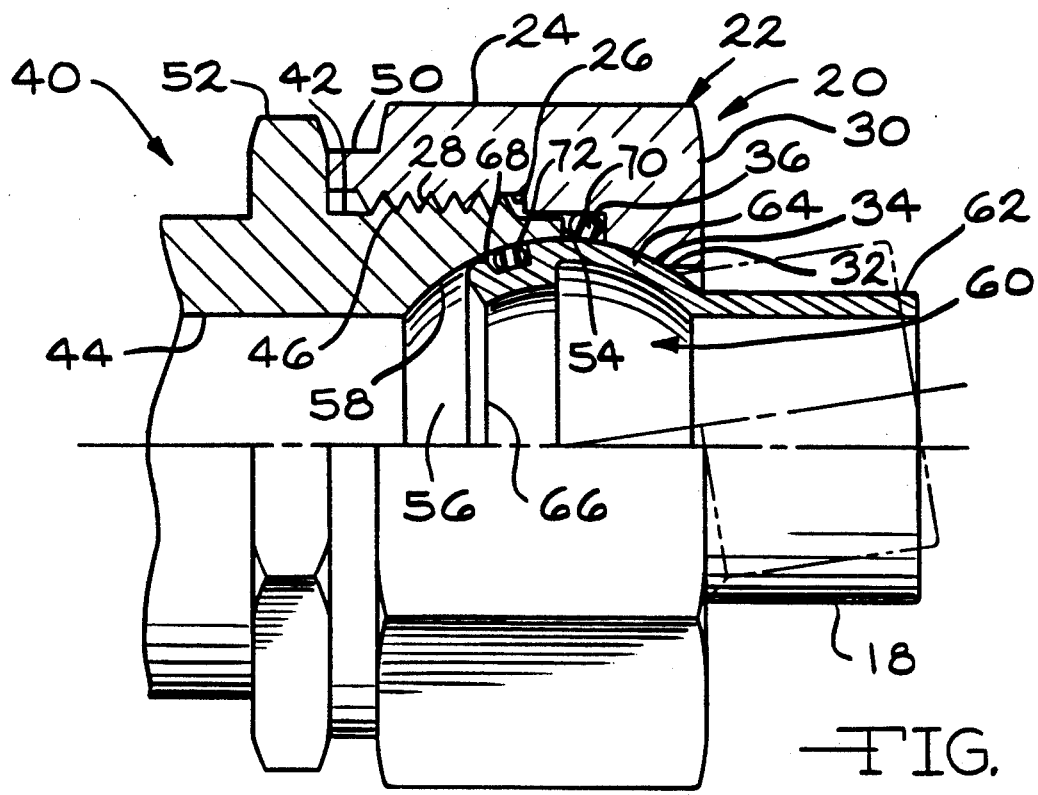
FIG. 2 is a side view of a first embodiment of the present invention with a section partially cut-away showing the connector, receiving means and ball means of the invention.

Referring to FIG. 2, a first embodiment of the present invention is shown. The assembly 20 includes a connector 22. The connector 22 has an outer surface 24 and a cylindrical inner surface 26. A portion of the inner surface 26 includes threads 28. The connector 22 further includes a radial inwardly extending flange 30 that terminates at an end 32. The end 32 of the flange 30 includes a surface 34 having a spherical shape. The flange also includes an inside wall 36.

The connector 22 can be made of a variety of materials depending on the application. It has been found that metal and plastic are suitable materials, with metal being preferred.

Still referring to FIG. 2, the assembly 20 has a receiving means such as an outwardly extending conduit 40 of a component of a vehicular air conditioning system. For example, the receiving means can be a conduit of an evaporator, a drier receiver filter or a compressor. However, it should be understood that the present invention can be used in conjunction with any suitable fluid conveying system depending on the application. The component conduit 40 can be made of either metal or plastic, with metal being preferred.

As shown in FIG. 2, the component conduit 40 includes an exterior surface 42 and an interior surface 44. A portion of the exterior surface includes threads 46 for receiving the threads 28 on the inner surface 26 of the connector 20. The mating of the threads 28 and 46 allows the connector 20 and the component conduit 40 to be connected together. When the connector and the component conduit are connected together during assembly, the forward progress of the connector can be prevented by the meeting of an outwardly extending connector stop 50 on the connector 20 and an outwardly extending land 52 on the component conduit 40. As described below, the engagement of the stop 50 and the land 52 retains the connector 20 in a predetermined position with respect to the component conduit 40.

Still referring to FIG. 2, the interior surface 44 of the component conduit at the leading edge 54 defines an open end 56. The interior surface 44 further defines a surface 58 having a spherical shape.

The ball 60 of the present invention is shown in FIG. 2. The ball 60, as shown in the present embodiment, is the end of a length of tubing in a vehicle, such as an automotive, air conditioning system. It should be understood that the ball can be formed by or attached to a variety of tubing in a number of fluid conveying systems depending on the application. By way of example, the ball 60 is the formed end of tube 18.

It has been found that rigid lengths of tubing formed of any one of a wide variety of materials are capable of transporting refrigerants throughout a system without effusion of refrigerant or infusion of undesirable moisture through the conduit walls. For example, the tubing may be formed of metal such as aluminum, steel or a variety of other metals, with aluminum being preferred from the standpoint of minimizing weight. Additionally, the tubing may be formed of a wide variety of plastics including nylon.

The tube 18 includes a wall 62. The wall 62 has a spherically-shaped outer surface 64 and an open end 66. The outer surface 64 can be achieved by enlarging the tube end, through processes well-known in the art, to form the spherical enlargement. The outer surface 64 also defines a channel 68. The outer surface 64 may be coated with synthetic resin polymers and products, including polytetrafluoroethylene polymers such as TEFLON ® material, that will serve to reduce frictional wear.

Still referring to FIG. 2, the wall 62 of the ball 60 is positioned adjacent the flange 30 of the connector 22 and the interior surface 58 of the component conduit 40. When the wall 62 is placed in this position, the outer surface 64 of the wall 62 engages surface 34 of the flange 30 and surface 58 of the component conduit 40. The surfaces 34 and 58 have shapes conforming to the spherically-shaped outer surface 64. The open end 66 of the tube 18 is in communication with the open end 56 of the component conduit 40 thereby allowing fluid to pass through the system.

In the embodiment shown in FIG. 2, the outer surface 64 is positioned within the connector 22 in a spaced relationship to the inner surface 26 of the connector. An annular gasket, such as an O-ring seal 70, is positioned in the space defined by the spaced relationship between the inside wall 36 of the flange 30 and the leading edge 54 of the component conduit 40 sealingly engaged to the inner surface 26 and the outer surface 64 of the ball 60. An annular gasket, such as an O-ring seal 72, is positioned in the channel 68 defined by the outer surface 64 sealingly engaged to the interior surface 58 of the component conduit 40 and the outer surface 64. Other seals having different configurations may be used in place of O-ring seals. The O-ring or other seals are preferably formed of resilient, chemically stable polymeric materials, such as nitrile, chlorobutyl, hydrogenated nitrile or neoprene.

In the embodiment shown in FIG. 2, the assembly 20 allows the tube 18 to articulate, pivot and rotate with respect to the connector 22 and the component conduit 40 during and after assembly because the surface 34 of the flange 30 does not provide sufficient frictional force against the outer surface 64 to prevent the movement of the ball 60. The wall 62 of the tube 18 is therefore free to move as shown by the phantom lines in FIG. 2.

Figure 3:
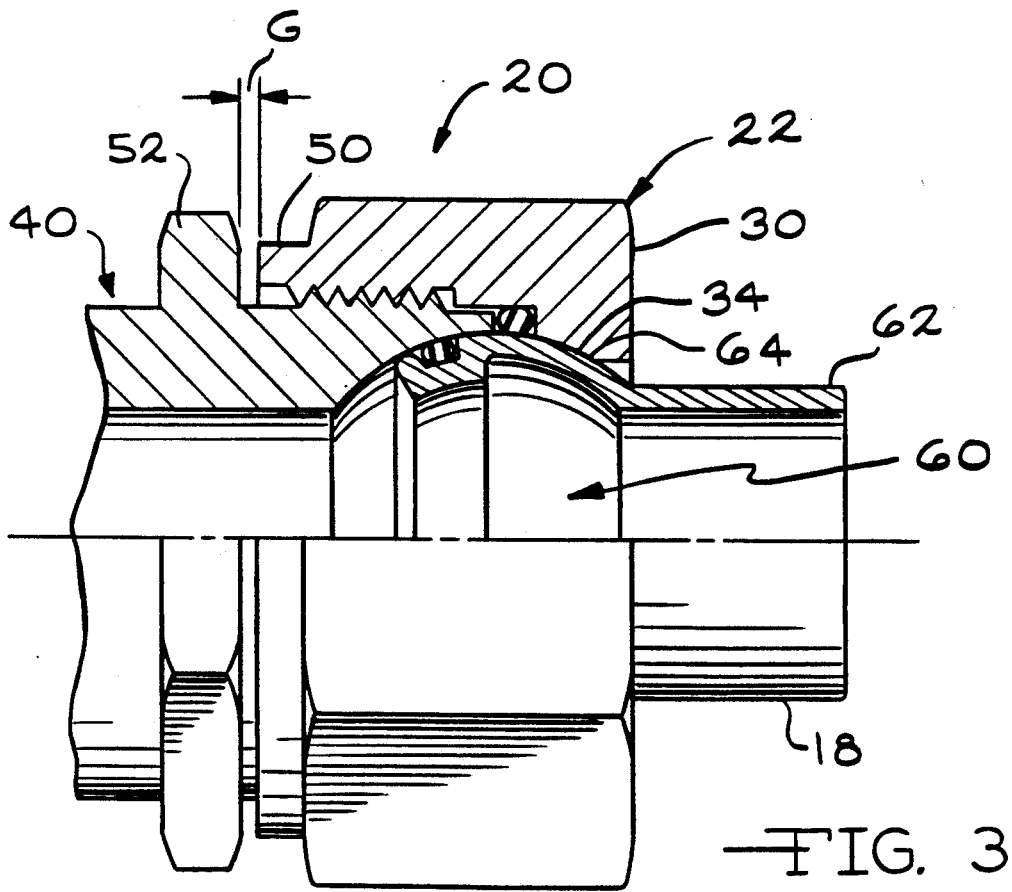
FIG. 3 is a side view of a second embodiment of the present invention similar to the view of FIG. 2.

Referring now to FIG. 3, a second embodiment of the present invention is shown. In this embodiment, there is a gap G between the connector stop 50 and the land 52 after the connector 22 has been fully tightened to the component conduit 40 during assembly. This results in the connector 22 being capable of being tightened so that the surface 34 of the flange 30 can provide enough frictional force against the outer surface 64 to prevent the ball 60 from moving with respect to the connector 22 and the component conduit 40. However, the ball 60, and therefore the tube 18, are free to move prior to the tightening of the connector 22. This allows the tube 18 to be manipulated during installation of an air conditioning system in, for example, an automobile. Except for the change in the configuration of the connector stop 50 and the land 52, the assembly 20 of the embodiment of FIG. 3 is essentially the same as that shown and described with respect to FIG. 2.

Figure 4:
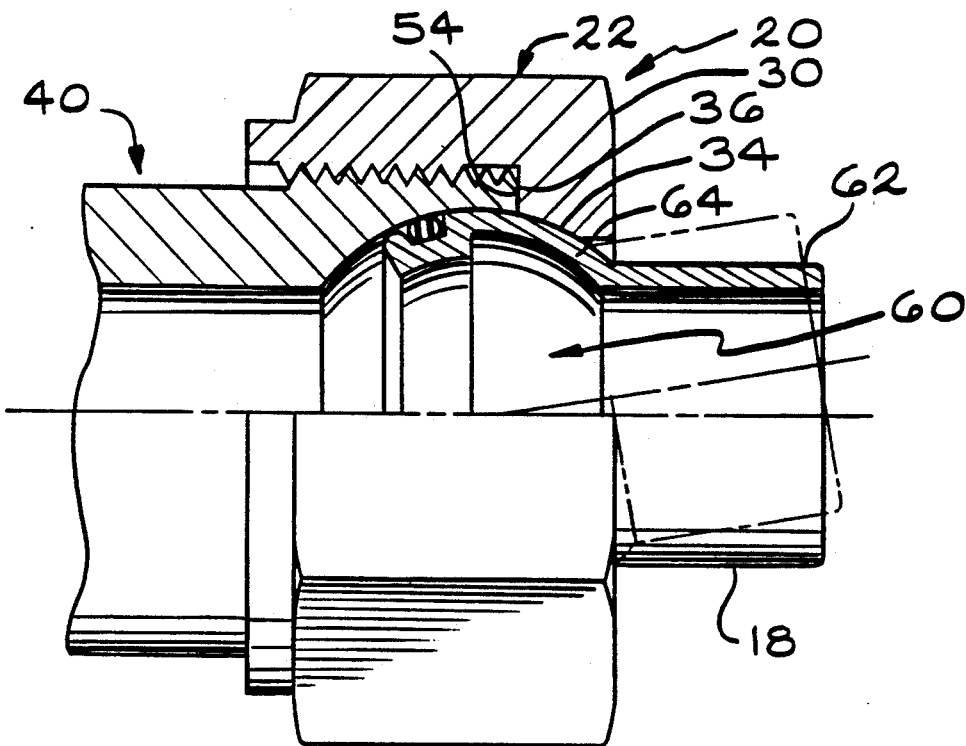
FIG. 4 is a side view of a third embodiment of the present invention similar to the view of FIG. 2.

A third embodiment of the present invention is shown in FIG. 4. In this embodiment, the component conduit 40 does not include a land. When the connector 22 is fully tightened to the component conduit 40, the inside wall 36 of the flange 30 engages the leading edge 54 of the component conduit 40. This engagement allows the tube 18 to articulate, pivot and rotate during and after assembly because the surface 34 of the flange 30 does not provide sufficient frictional force against the outer surface 64 to prevent the movement of the ball 60. Therefore, the wall 62 of the tube 18 is free to move as shown by the phantom lines in FIG. 4. Except for the elimination of the land 52 and the annular gasket 70, the assembly 20 of the embodiment of FIG. 4 is essentially the same as that shown and described with respect to FIG. 2.

Figure 5:
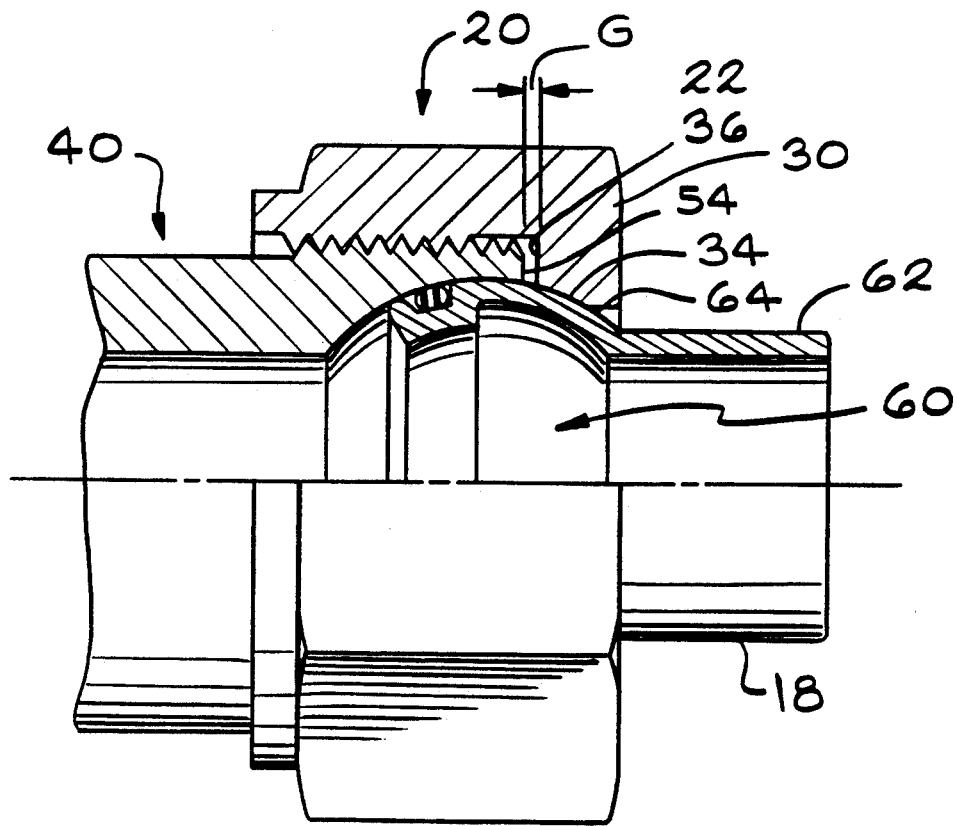
FIG. 5 is a side view of a fourth embodiment of the present invention similar to the view of FIG. 2.

The fourth embodiment of the present invention is shown in FIG. 5. In this embodiment, there is a gap G between the inside wall 36 of the flange 30 and the leading edge 54 of the component conduit 40 after the connector 22 has been fully tightened to the component conduit 40 during assembly. This results in the frictional force against the outer surface 64 of the ball 60 and the lack of movement of the tube 18 as described with respect to the embodiment shown in FIG. 3. Except for the provision of the gap G and the elimination of the land 52 and annular gasket 70, the assembly 20 of the embodiment of FIG. 5 is essentially the same as that shown and described in FIG. 2.

Figure 6:
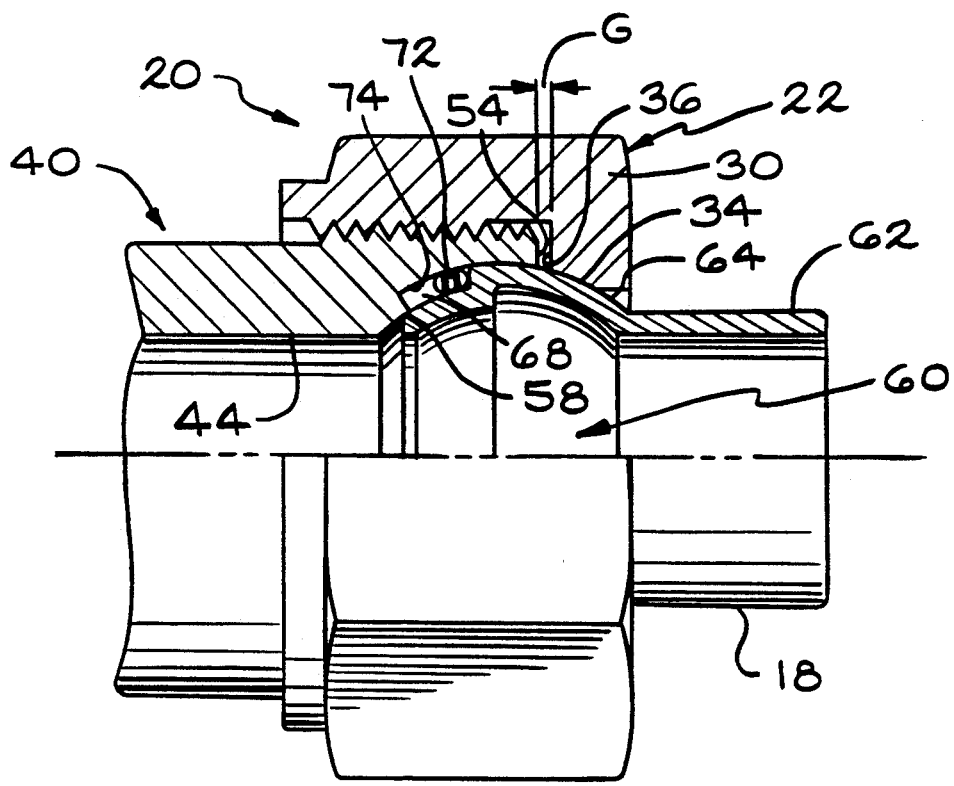
FIG. 6 is a side view of a fifth embodiment of the present invention similar to the view of FIG. 2.

Referring now to FIG. 6, a fifth embodiment of the present invention is shown. In this embodiment, the channel 68 defined by the outer surface 64 is elongated. The interior surface 44 of the component conduit 40 defines a reciprocal channel 74 on the surface 58. The channels 68 and 74 form an annular chamber for receiving an annular gasket, such as an O-ring seal 72. The O-ring seal 72 sealingly engages the outer surface 64 of the ball 60 and the interior surface 44 of the component conduit 40.

A gap G is provided between the inside wall 36 of the flange 30 and the leading edge 54 of the component conduit 40 after the connector 22 has been fully tightened to the component conduit 40 during assembly. As described above, this results in frictional force against the outer surface 64 and the lack of movement of the tube 18. Except for the provision of an elongated annular chamber and the gap G and the elimination of the land 52 and annular gasket 70, the assembly 20 of the present embodiment is essentially the same as that shown and described in FIG. 2.

Figure 7:
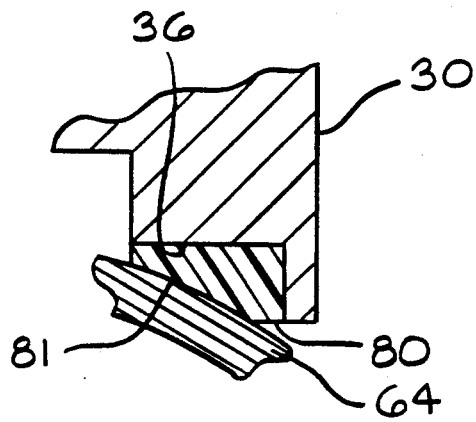
FIG. 7 is a fragmentary section view of another embodiment, including an insert positioned in the flange of the connector.

Referring to FIG. 7, in this embodiment an insert 80 is positioned in a recess provided in the surface of the flange 30 adjacent the outer surface 64 of the ball.

The insert 80 acts as a bearing for movement of the ball and can be constructed of various materials including nylon or a polytetrafluoroethylene polymer, such as a TEFLON® material. The insert 80 in the present embodiment comprises a one-piece ring, but in the alternative may be constructed of two or more parts.

Figure 8:
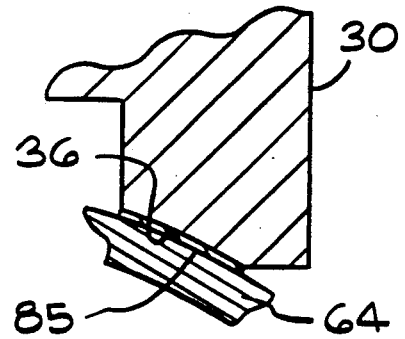
FIG. 8 is a fragmentary view of a further embodiment similar to FIG. 7.

Another embodiment is shown in FIG. 8. A bearing insert such as a bearing layer 85 is positioned on the surface of the flange 30 adjacent the outer surface 64 of the ball. The bearing layer 85 may be constructed of differing materials including a TEFLON® material.

Figure 9:
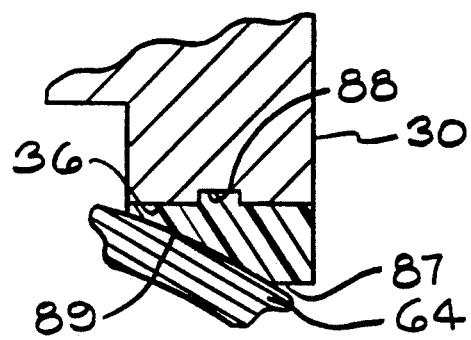
FIG. 9 is a fragmentary view of still another embodiment similar to FIG. 7.

Referring to FIG. 9, a still further embodiment includes an insert 87 which has an outwardly extending portion received in a groove 88 defined in the inner surface of the flange 30. Again, the insert 87 acts as a bearing for movement of the ball. The insert 87 can be constructed of various materials, including nylon or a polytetrafluoroethylene polymer, such as a TEFLON® material.

It should be understood that many changes can be made to the present invention disclosed in the drawings and still fall within the scope of the following claims.

I claim:

1. A connector and ball joint assembly for an automotive conduit system comprising, in combination:

a connector, said connector having a flange means, said flange means being radial inwardly extending terminating at an end, said end including a surface contoured with a spherical shape, said connector having a cylindrical inner surface, a portion of said inner surface includes attachment means;

a receiving means, said receiving means having an exterior surface and an interior surface, a portion of said exterior surface includes attachment means for receiving said attachment means on said inner surface of said connector, said interior surface of said receiving means defining an open end;

a ball means, said ball means having a wall, said wall having a spherically-shaped outer surface defining an open end, said wall engaging said flange means of said connector and said interior surface of said receiving means, said spherically-shaped outer surface further defining an integral, U-shaped channel receiving one annular gasket means, said annular gasket means sealingly engaged to said interior surface of said receiving means and said outer surface of said ball means; and bearing means positioned on said end of said flange adjacent said outer surface of said ball means, said bearing means acting as a bearing for movement of said ball means.

2. The connector and ball joint assembly of claim 1, wherein said connector includes an outwardly extending connector stop.

3. The connector and ball joint assembly of claim 2, wherein said receiving means includes an outwardly extending land for engaging said connector stop to prevent the forward progress of said connector during assembly.

4. The connector and ball joint assembly of claim 1, wherein said receiving means is comprised of a radial outwardly extending conduit of a component of an automotive air conditioning system.

5. The connector and ball joint assembly of claim 1, wherein said interior surface of said receiving means includes a surface contoured with a spherical shape conforming to and engaging said spherically-shaped outer surface of said ball means.

6. The connector and ball joint assembly of claim 1, wherein said ball means is comprised of the end of a length of tubing.

7. The connector and ball joint assembly of claim 1, wherein said spherically-shaped outer surface of said ball means is positioned within said connector in spaced relationship to said inner surface of said connector.

8. The connector and ball joint assembly of claim 7, wherein at least one annular gasket means is positioned in the space defined by said spaced relationship sealingly engaged to said inner surface and said spherically-shaped outer surface.

9. The connector and ball joint assembly of claim 8, wherein said annular gasket means is an O-ring seal.

10. The connector and ball joint assembly of claim 1, wherein said annular gasket means is an O-ring seal.

11. The connector and ball joint assembly of claim 1, wherein said ball means can articulate, pivot and rotate with respect to said connector and said receiving means.

12. The connector and ball joint assembly of claim 1, wherein said attachment means on said connector and said receiving means are threads.

13. A connector and ball joint assembly for an automotive air conditioning system comprising, in combination:
- a connector comprised of a cylindrical body having an integral radial inwardly extending flange terminating at an end, a portion of said end having a spherically-shaped surface, said cylindrical body having a cylindrical inner surface, said inner surface including threads;
- a radial outwardly extending conduit of a component of an air conditioning system having exterior and interior surfaces, said exterior surface including threads for receiving said threads on said inner surface of said connector, said interior surface defining an open end;
- a length of tubing having a wall including a spherically-shaped outer surface defining an open end, said outer surface positioned within said connector and said conduit engaging said spherically-shaped surfaces of said flange and said conduit in spaced relationship to said inner surface of said connector, said spherically-shaped outer surface further defining an integral, U-shaped channel receiving one annular gasket means, said annular gasket means sealingly engaged to said interior surface of said conduit and said spherically-shaped outer shaped of said tubing; and
- a bearing insert positioned on said end of said flange adjacent said spherically-shaped outer surface, said bearing insert acting as a bearing for movement of said outer surface.

14. The connector and ball joint assembly of claim 13, wherein at least one annular gasket means is positioned in the space defined by said spaced relationship sealingly engaged to said inner surface and said spherically-shaped outer surface.

15. The connector and ball joint assembly of claim 14, wherein said annular gasket means is an O-ring seal.

16. The connector and ball joint assembly of claim 13, wherein said length of tubing can articulate, pivot and rotate with respect to said connector and said component conduit.

* * * * *